(12) United States Patent
Schowe et al.

(10) Patent No.: US 6,295,234 B1
(45) Date of Patent: Sep. 25, 2001

(54) SEQUENCER BASED SERIAL PORT

(75) Inventors: Lester Schowe, Louisville; Steven E. Thomson, Lafayette, both of CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/584,513

(22) Filed: May 31, 2000

(51) Int. Cl.[7] ........................................................ G11C 7/00
(52) U.S. Cl. ................................ 365/189.12; 365/189.01; 365/230.03
(58) Field of Search ..................... 365/189.01, 230.01, 365/189.12, 230.03, 230.09

(56) References Cited

U.S. PATENT DOCUMENTS

| | | | |
|---|---|---|---|
| 5,611,066 | * 3/1997 | Keele et al. | 365/189.12 |
| 5,806,085 | 9/1998 | Berliner . | |
| 5,890,219 | 3/1999 | Scaringella et al. . | |

* cited by examiner

*Primary Examiner*—Terrell W. Fears
(74) *Attorney, Agent, or Firm*—W. Daniel Swayze, Jr.; W. James Brady; Frederick J. Telecky, Jr.

(57) ABSTRACT

Serial port circuitry (2) for use in a mass data storage device (5) and a method for configuring and operating it are disclosed. The serial port circuitry includes a serial port (2) for providing information from circuitry within the mass data storage device (5) for use external to said mass data storage device and user programmable circuitry connected to the serial port to receive externally applied signals (6) to modify at least one parameter of said mass data storage device (5). The user programmable circuitry preferably includes a sequencer (12, 18, 22) programmed to selectively provide at least two different serial port control outputs (162,212) to modify at least two parameters of said mass data storage device. The sequencer (12, 18, 22) executes pre-established program instructions contained in a RAM (12) to control the mass data storage device. The sequencer includes a state machine (30) configured by selected outputs states of the RAM, an address generator (18) for applying addresses to the RAM for producing the selected outputs from the RAM, and a timing circuit (22) for timing programmable time periods for continuing execution of selected RAM output commands.

26 Claims, 9 Drawing Sheets

SEQUENCER BASED SERIAL PORT

BACKGROUND OF THE INVENTION

1. Field of the Invention

This invention relates to improvements in mass data storage devices, or the like, and methods for using and operating same, and more particularly to improvements in serial port circuits used in conjunction with mass data storage devices, or the like, and methods for using and operating same.

2. Copyrighted Materials

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

3. Relevant Background

Mass data storage devices include well known hard disk drives that have one or more spinning magnetic disks or platters onto which data is recorded for storage and subsequent retrieval. Hard disk drives may be used in many applications, including personal computers, set-top boxes, video and television applications, audio applications, or some mix thereof. Many applications are still being developed. Applications for hard disk drives are increasing in number, and are expected to further increase in the future.

Typically hard disk drives are sold as an assembly that includes a rotating magnetic medium and a selectively positionable head or data transducer for writing data to and reading data back from the magnetic medium. The assembly also typically includes the necessary electronics to control the rotation of the motor, position of the data transducer or head, conditioning of the data signals associated with the drive, and so on.

In many system architectures and in mass data storage device architectures specifically, Application Specific Integrated Circuits (ASICs) generally communicate to peripheral devices through a serial communication link. This serial communication link is referred to as the "serial port". The serial port is generally used in cases where the data rate requirement is low. The advantage of using the serial port over the use of some sort of parallel interface is the efficient use of package pins for the communication function. A typical serial port requires a three-pin interface, whereas a parallel interface may use as many as 18 pins (for a 16 bit interface). These serial ports are generally bi-directlonal, and typically include three signals: clock, shift-gate, and bidirectional data.

The serial port is usually provided as a part of the read channel electronics that is associated with the hard disk drive. The serial port is generally not used in conjunction with the actual user data processes, but, instead, allows the user access to some of the various registers and other data handling circuitry of the device. Some of the various functions that can be controlled via the serial port, for example, include the gain of the preamplifier associated With the head, the control of the parameters of the head, the speed control for the motor that spins the disk, the control of at least some of the parameters of the voice intro motor (VCM), and so on.

Even though the use of a serial port interface is common in the industry, there is no generally accented standard set that specifies the requirements for timing, logic levels, and so forth. This has resulted in many different and incompatible specifications of serial port interfaces. Each organization that develops an ASIC with a serial port included tends to also generate its own unique interface specification.

Thus, in the past, one of the problems that has been encountered by hard disk drive circuitry manufacturers is the lack of standards defining serial port operations. Therefore, the particular serial port that is associated with any particular drive may differ from those of other drives; that is, each manufacturer may have its own designs and functionalities for its serial ports that are associated with its own drives, and, moreover, may even have different serial port designs among its own different drive models.

As a result of the lack of standards, the serial ports of each disk drive manufacturer are often different from the others. As a result, ASIC designers had to design a unique serial port driver for each application. Sometimes programmability was incorporated into the serial port design with the intent that the serial port would be able to handle several different interface specifications without hardware changes. Repeatedly, however, after the ASIC had been produced, the requirement for a new interface specification would be encountered in the system that would be unique enough that the original serial port driver could not handle it. This, in turn would necessitate the modification of the entire ASIC just to meet the new serial port specification. Consequently, companies that provide ASICs and other supporting chips to the different disk drive manufacturers must custom make each serial port interface to be associated with respective hard drive manufacturer's product. This is time consuming, adds costs to the design of the chip, and adds time that is required for the completion of the chip for delivery.

In many past applications the "non-standard serial port" problem was manageable because the disk drive manufacturer would design an ASIC for a specific disk drive product. The disk drive product was associated with a specific set of peripherals, and the unique serial ports encountered would be designed for as needed. When the next disk drive produce came along (for instance, 10 million units later), an ASIC redesign would be required for the new technology anyway so a new serial port design did not cause any real issue.

A real problem arises, however, when an ASIC manufacturer attempts to design an ASIC product to be sold to many different customers, all of which have different serial port interfaces associated with their products. Since it would not be cost effective to design a specific ASIC for each different customer or for each customer's different application, a need exists for a highly programmable serial port that can handle nearly any specification encountered.

What is needed, therefor, is a circuit and method for enabling the ease of modification of the parameters of a serial port for use in a hard disk drive, or the like.

SUMMARY OF THE INVENTION

In light of the above, therefore, it is an object of the invention to provide a serial port, Which has programmable parameters to enable the serial port to be easily modified for different disk drive configurations.

It another object of he invention to provide a programmable serial port of the type described that does not require a significant number of memory elements.

The problem outlined above is solved, according to one embodiment of the invention, by incorporating a RAM (or ROM) based sequencer into the serial port design. Using this approach the serial port becomes highly programmable, and the characteristics of the serial port can be determined by the firmware, which is loaded into, and later executed from the RAM. The ASIC is no longer constrained by the unique hardware implementation of the serial port (which was, in turn, determined by the unique set of peripherals associated with the ASIC). The firmware can be changed as needed to handle any serial port specification changes that may arise. The RAM can also be reprogrammed on the fly by the DSP or microprocessor if needed to handle any different serial port device types that may also be attached to the serial port bus.

The sequencer based serial port design results in a very simple and powerful architecture with the additional advantage that it is inherently "scan" compatible, and is easy to test to high fault levels. It also facilitates use within a company as a standard function that can be used by many groups.

Thus, in accordance with a broad aspect of the invention, serial port circuitry is provided for use in a mass data storage device. The serial port circuitry includes a serial port for exchanging information from circuitry within the mass data storage device with circuitry external to the mass data storage device. The internal circuitry may be user programmable, connected to the serial port to receive externally applied signals to modify at least one parameter of the serial port, or of the mass data storage device. The user programmable circuitry includes a sequencer programmed to selectively provide at least two different serial port control outputs to modify at least two parameters of the serial port.

The sequencer executes pre-established program instructions to control the serial port, or the mass data storage device. Preferably, the instructions are contained in a RAM, and a state machine is provided that is configured by selected outputs states of the RAM An address generator applies addresses to the RAM for producing the selected outputs from the RAM, and a timing circuit times programmable time periods for continuing execution of selected REM output commands. The address generator provides at least a start address, an incremented address, and a branch address for application to the RAM.

At least one serial port shift register is provided which is configured by the state machine at least with respect to a direction data is shifted into and out thereof. The state machine additionally may configure the serial port shift register to contain a selected number of bits.

Optionally, two shift registers may be provided. One of the two shift registers may be programmably configured to serve as a data register and one of the two shift registers is as an address register. Alternatively, both of the two shift registers may be programmably configured to be data registers.

According to another broad aspect of the invention, serial port circuitry is provided for use in a mass data storage device. The serial port circuitry includes a RAM programmed to contain operation codes and serial port configuration data, the RAM being addressable for producing the addressed operation codes and port configuration data on outputs of the RAM. A circuit is provided for addressing the RAM in a predetermined sequence to operate serial port circuits in accordance with the operation codes and configuration data contained in the RAM. A circuit is provided for timing a repeat time, determined by data contained in the RAM, for continuing selected output operation codes and configuration data for the repeat time. A serial port shift register is provided for receiving and delivering data to and from the serial port. The circuit for addressing the RAM operates to selectively sequentially increment addresses applied to the RAM, branch to a selected unsequential address, and repeat an address for a predetermined repeat time determined by the circuit for timing a repeat time.

A state machine delivers control signals to the shift register in accordance with the operation codes and configuration data contained in the RAM. The state machine configures the serial port shift register with respect to a direction data is shifted into and out thereof, with respect to a number of bits the register contains, or other selected parameters.

According to another broad aspect of the invention, a mass data storage device is presented. The mass data storage device includes serial port circuitry for use in a mass data storage device. The serial port circuitry includes a RAM programmed to contain operation codes and serial port configuration data. The RAM is addressable for producing the addressed operation codes and port configuration data on outputs of the RAM. A circuit addresses the RAM in a predetermined sequence to operate serial port circuits in accordance with the operation codes and configuration data contained in the RAM. A circuit times a repeat time, determined by data contained in the RAM, for continuing selected output operation codes and configuration data for the repeat time. The circuit for addressing the RAM operates to selectively sequentially increment addresses applied to the RAM, branch to a selected unsequential address, and repeat an address for a predetermined repeat time determined by the circuit for timing a repeat time.

A serial port shift register is provided for receiving and delivering data to and from the serial port. A state machine delivers control signals to the shift register in accordance with the operation codes and configuration data contained in the RAM. The state machine operates to configure the serial port shift register with respect to a direction data is shifted into and out thereof, with respect to a number of bits the register contains, or other desired parameter. An address shift register is also provided, having at least come configuration parameters controlled by the state machine.

According to yet another broad aspect of the invention, a method is presented for operating a serial port in a mass data storage device. The method includes providing a state machine having outputs for configuring circuitry of the serial port and generating a sequence of operation codes for specifying the outputs of the state machine.

Generating a sequence of operation codes may be performed by holding a predetermined operation code set for a predetermined time specified by at least one of the operation codes. Providing a state machine having outputs for configuring circuitry of the serial port may be performed by providing a state machine having outputs for configuring at least a serial port shift register. The serial port shift register may be configured by configuring a shift direction of data in the serial port shift register, configuring the serial port shift register to contain a specified number of bits, or configuring another parameter of the serial port shift register.

These and other objects, features, and advantages will become apparent from the following detailed description, when read in conjunction with the appended claims and accompanying drawings.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

Figure 1:
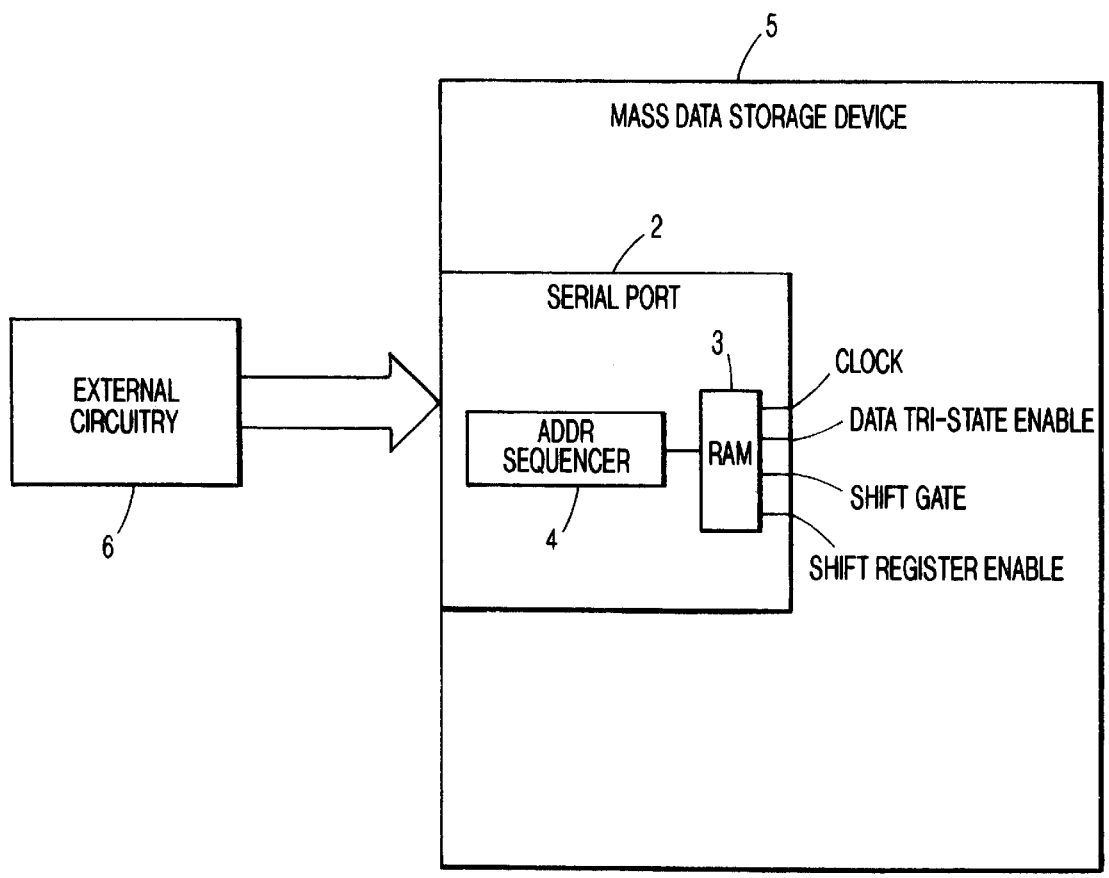
FIG. 1 is a block diagram of a mass data storage device incorporating sequencing serial port circuitry, in accordance with a preferred embodiment of the invention.

According to one preferred embodiment of the invention, an interface to a serial port of a mass data storage device, the serial port circuitry, and the method for operating it is provided. One way to implement a sequencer based serial port 2 is shown in FIG. 1, to which reference is now made. The serial port 2 connects the outputs of a RAM 3 directly to a clock pin, a data pin tri-state enable pin, and a shift gate pin, as well as a shift register shift enable pin. Then, as the address to the RAM 3 from an address sequencer 4 is incremented from a start address to a stop address, the serial port pins are directly driven by the outputs of the RAM 3. This results in a highly programmable scheme to interface the mass data storage device to external circuitry 6. However, a minimum of one serial port read and one serial port write operations are required to be loaded into the RAM in order to implement these serial port functions. The implementation just of a serial port read and a serial port write operation requires a considerable amount of RAM.

Thus, according to another preferred embodiment of the invention, the RAM size is considerably reduced by completing the serial port operations by using discrete phase types, an embodiment of which is shown in FIGS. 2–10b, to which reference is now additionally made. For example, four phase types may be advantageously employed. For instance, a serial port write operation may be accomplished using an initial condition phase in which the serial port starts with a known logic state on the clock, data, and shift gate pins. After the initial condition phase, a setup phase is performed in which a serial port communication is triggered to start and the logic states of the three serial port pins are changed a few times. After the startup phase, a repeat phase is performed. In the repeat phase, the clock toggles continuously at every state machine cycle, the data shift register shifts data every other state machine cycle, and the shift gate and the data tri-state enable remain the same. All toggle operations are started from the state left at the end of the setup phase. Finally, a finish phase is performed. In the finish phase, the three serial port pins are run through several states until they reach their final resting state, which is the same state as the initial condition state mentioned above. The serial port remains in this state until the next communication transfer is triggered.

In this example, two modes of operation are used: a direct drive mode, using the initial condition phase, setup phase, and finish phase use the direct drive mode, and a repeat mode, using the repeat phase.

In the direct drive mode, the clock pin, the shift gate pin, data pin tri-state enable, and the shift register shift enable of the serial port are driven directly from the output of the RAM. In the repeat mode, the clock pin continuously toggles every state machine cycle, the shift register shift enable is enabled every other state machine cycle, and the data pin tri-statte enable and shift gate pin remain the same.

The repeat mode is entered by the execution of an op-code, which also loads an operand from the RAM into a counter. The value in the counter then determines the number of state machine cycles that the state machine will remain in the repeat mode. While the serial port is held in repeat mode by the operation of the counter, the address to the RAM is held at the present value, the clock pin and the shift register shift enable toggles every state machine cycle and the data pin tri-state enable and the shift gate pin are held at the same logic state.

At the end of the repeat mode, the direct drive mode is automatically re-entered. While the serial port is in the direct drive mode, the address to the RAM is incremented every state machine cycle, the clock pin, shift register shift enable, data pin tri-state enable and the shift gate pin are again driven directly by the RAM.

More particularly, the serial port sequencer has four op-codes to control the state of the machine:

1) Default: The address to the RAM continuously increments, thereby executing sequential op-codes. Direct drive mode is engaged;

2) Stop: Stop all changes to the RAM address; i.e., halt. Direct drive mode is engaged;

3) Repeat: Load the counter with the applicable operand from the RAM, toggle the state of the clock pin every state machine cycle, shift a new data bit from the shift register every second state machine cycle, and hold the state of the data pin tri-state enable and shift gate the same. Count the counter value down one count each state machine cycle, and continue until the counter counts to a value of zero, then re-enter the default state; and 4) Branch: Causes the RAM address to change to the operand value on the next state machine cycle. Direct drive mode is engaged.

Figure 2:
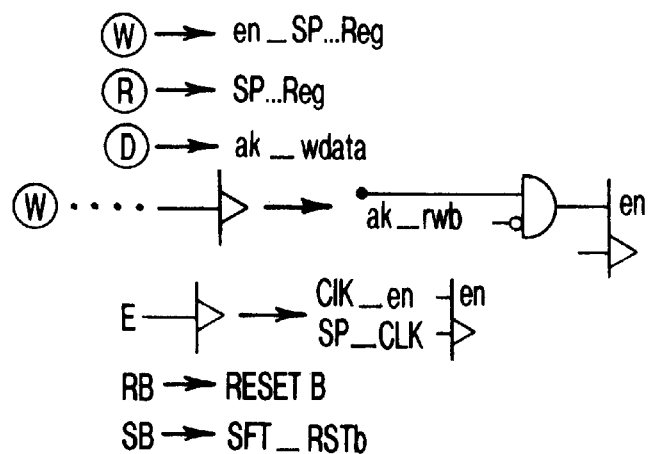
FIGS. 2–10b is an electrical schematic diagram of circuitry, using a labeling interconnection convention, of a sequencer based serial port interface, in accordance with a preferred embodiment of the invention.

With reference again to FIGS. 2–10b, a block diagram of a circuit for providing an interface to a serial port of a mass data storage device, or the like, is shown in FIGS. 2–10b. The circuit operates in the phases and modes described. The circuit of FIG. 2 shows a list of externally applied signals, as they are applied to the various carts of the circuit shown in FIGS. 3a–10b. The block diagram of FIGS. 2–10b is illustrated as a number of separate circuit parts, but i should be understood that a single circuit is represented in the figures of the drawings, and a label interconnection convention is employed.

The operation of the circuit is based upon a two port static RAM 12. The RAM 12 is addressed by five address lines 14 that are generated by an addressing circuit 18, shown in detail in FIG. 3b. The output from the RAM 12 is provided on bus 20 to control other circuit functions, as below described in detail. Briefly, these functions are performed by the following circuitry: a repeat count timer circuit 22 shown in FIG. 4, a first RAM configuration register 24, shown in FIG. 5, a second RAM configuration register 102 shown in FIG. 6, a run control circuit 28 shown in FIG. 6, a state machine circuit 30, shown in FIG. 7, an op-code decoder 32, shown in FIG. 8, a serial port (SP) clock enabled generator 34, shown in FIG. 9, and input and output data and/or address shift registers 36 and 38, shown respectively in FIGS. 10a and 10b.

The port configuration data is received by the two port static RAM 12 on input data bus 40, which can be, for example, 13 bits wide, as shown. The port configuration data may be externally provided by a user to configure the serial port according to the particular needs desired. (Although a RAM 12 is illustrated, the RAM 12 may be replaced by a programmed RCM. The RAM embodiment shown, of course, is more flexible.)

Figure 4:
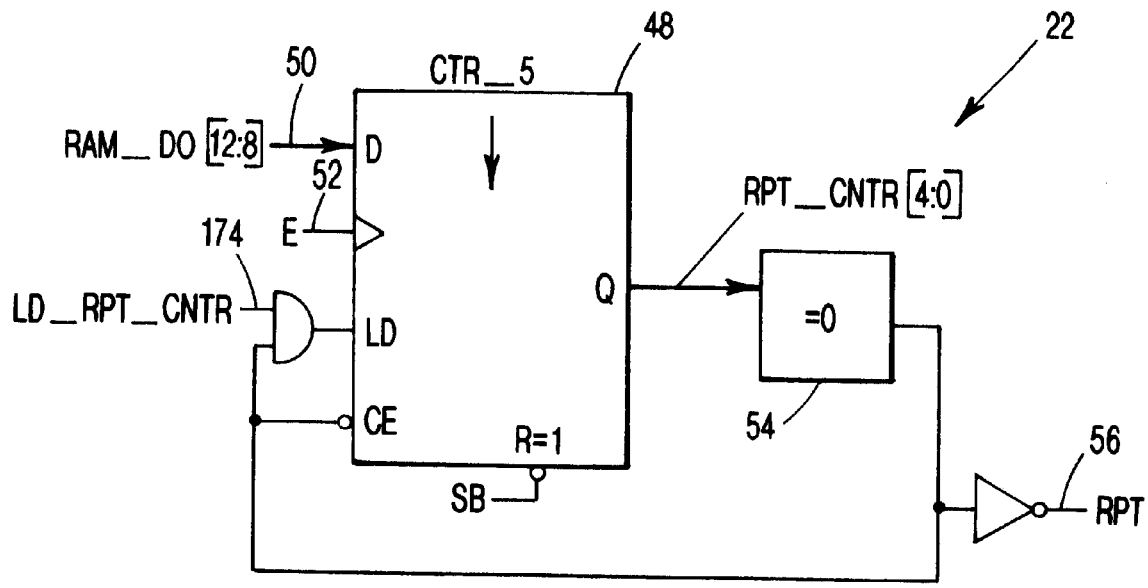

The control of the write function of the RAM 12 may be controlled by a write enable signal, which is a combination of the "W" signal, the AK-RWB signal, and a load RAM signal, which is developed by the configuration register circuit 24 of FIG. 4. The write address into which the data applied on bus 40 is written is supplied to the RAM 12 on input bus 44.

In operation, all of the various interface control functions of the serial port are controlled by the values loaded into the RAM 12, as will become apparent from the detailed description below. For example, when a "repeat" function is to apply, the desired delay time may be loaded into the RAM 12 such that the output data, for example, on bit lines [8–12] contain the repeat value. The repeat value may specify, for example, the length of time that a particular process is to be timed in terms of a predetermined number of clock cycles, or the length of time that a particular state is intended to be applied to the serial port in terms of a predetermined number of clock cycles. The repeat value is then loaded into a register circuit 22, shown particularly in FIG. 4.

The register circuit 22 may include, for example, a number of D-type flip-flops 48 which are clocked by a clock signal "E" on line 52. The data input lines are received from output ports [8–12] of the RAM 12 on bus 50. The output Q from the flip-flops 48 is tested by a test circuit 54 to determine whether they have reached 0. The low state of the output from the test circuit 54 continues to apply a chip enable input signal to the flip-flops 48, until the 0 value is reached. When the zero value is reached, the output from the test circuit 54 changes state to disable the continued count of the flip-flop 48, and to report a completion of the repeat t-me on the circuit output line 56. As can be seen, the recent output provides signals to a number of other circuits, including the RAM address control circuit 18 and the gates of the overall circuit state machine control circuit 30 of FIG. 7.

Figure 3A:
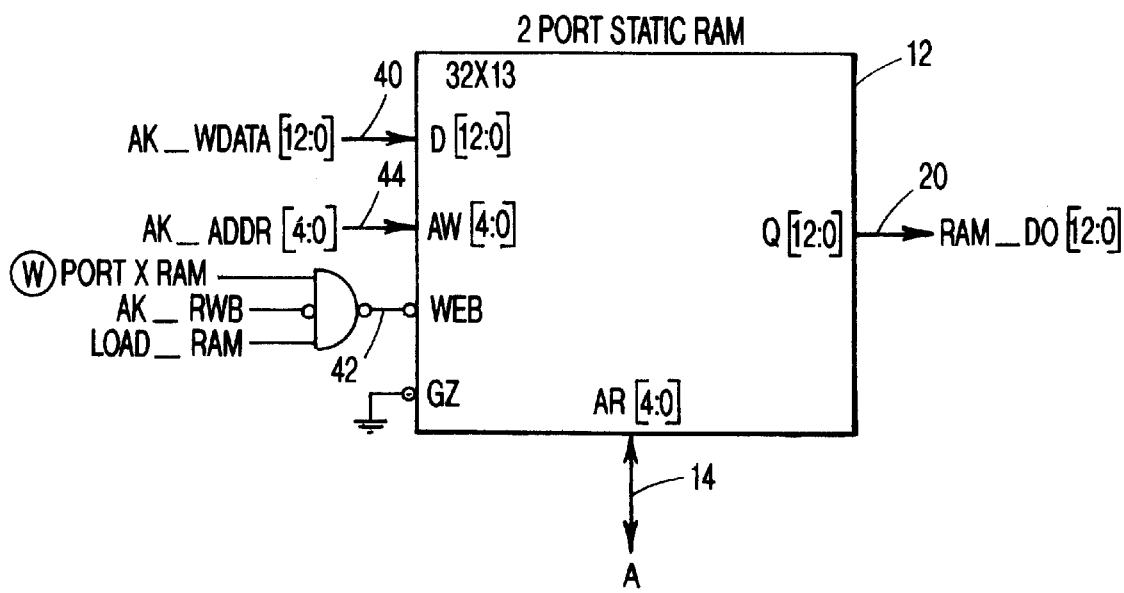
Figure 3B:
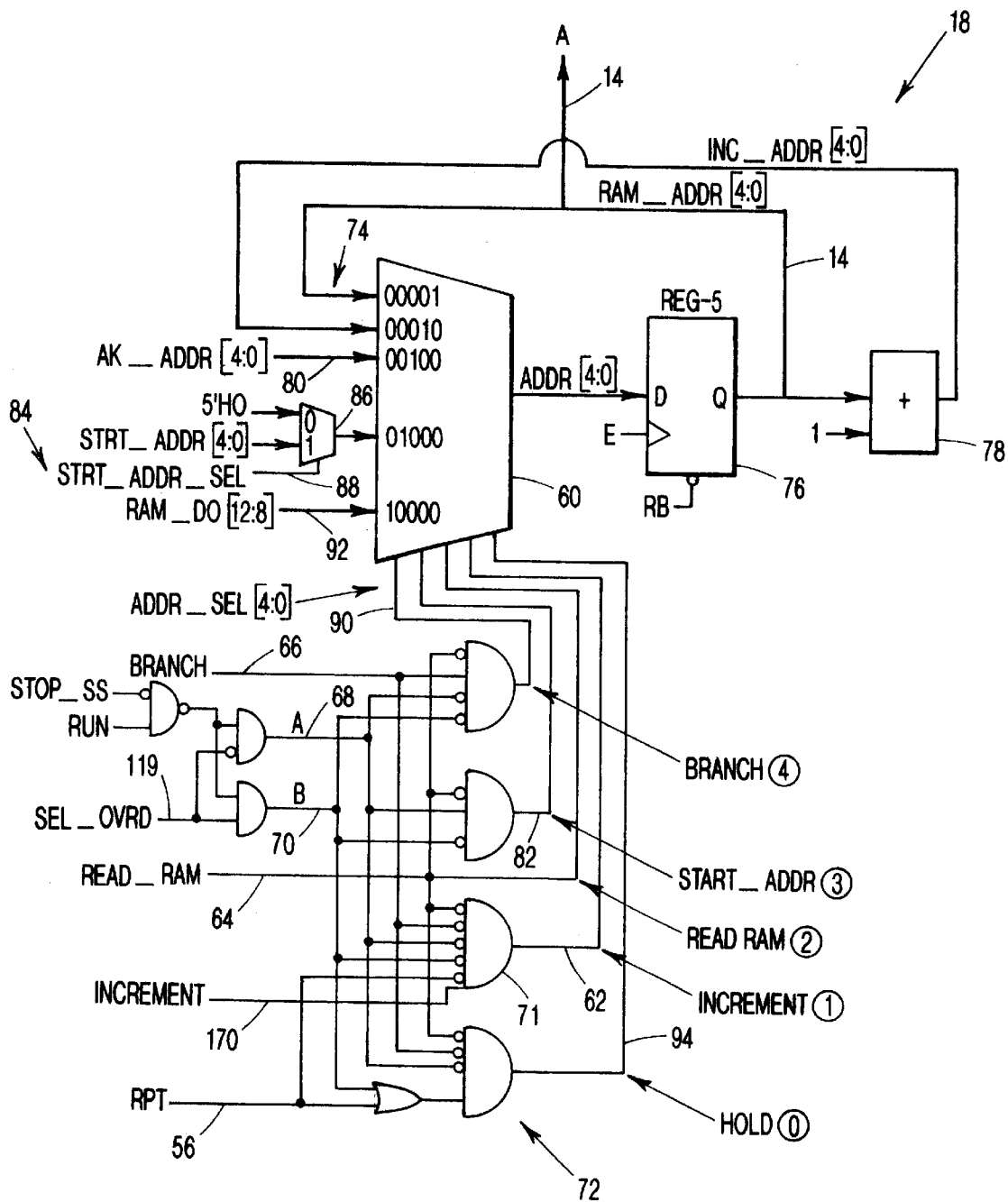

The RAM 12 is addressed by an addressing circuit 18, shown in FIG. 3b, to produce the particular desired output on the output data bus 20 from the RAM 12. The address signals are applied on bus 14 to the addressing ports of this data RAM 12.

The address circuit 18 includes a multiplexer 60, which controls the passage of signals to the RAM 12 to control its output, depending upon the particular desired function. The outputs from four AND gates 72 and a "read RAM" signal on line 69 provide five input signal to the multiplexer 60 to select which of the input lines 74 are passed through the multiplexer 60 to control the RAM 12.

For example, to increment the address applied to the RAM 12, an increment command is provided on line 62. The increment command is controlled by the concurrence of a repeat signal on line 56, a read RAM command on line 64, a branch command on line 66, a stop command on line 68, and a select command on line 70, on the inputs of the AND gate 71. As can be seen the inputs to the AND gate 71 are each inverted, so that the absence of the input signals provides the address incrementing signal.

Thus, when the signal on the increment line 62 is high, the input signal at input terminal 00010 is allowed to pass to be clocked through a resister 76 and incremented by an adder 78, to be recirculated back to the input terminal to be consecutively increased with each successive clock cycle. Thus, during the increment process, the address applied to the RAM 12 is provided at the output of the register 76 on output bus 14.

On the other hand, when the LAM 12 is to be read, a "read RAM" signal is applied on line 64 to pass an address on input terminal 00100 on input lines 80 for application to the RAM 12 on the RAM address line 14.

In order to specify a start address from which the contents of the RAM 12 are accessed, a "start address" command signal is applied on line 82 to configure the multiplexer 160 to pass the start address determined by the circuit 84 at the input associated therewith. The start address is determined by five address bits or a 0 value selectively determined by the multiplexer 86, which is controlled by a start address select signal on line 88. The address that is passed by the multiplexer 60 is, in similar fashion to the signal selection process described above passed on bus 14 at the output of the register 76 to the address input of the RAM 12.

If a branch command is to be applied to the RAM 12 so that the address from which the output is taken is selected from a different section of the RAM 12, the branch is controlled by a branch control signal on line 90 to select the input to the multiplexer 60 at input terminal 10000. The branch address is applied on input line 92 to be passed by the multiplexer 60 and applied via bus 14 to the address terminals of the RAM 12.

Finally, a "hold" command may be applied via line 94 to the multiplexer 60 to select the input at input address 00001, which continuously circulates the same address that occurs on bus 14, so that no action is taken to change the current output of the RAM 12.

Figure 5:
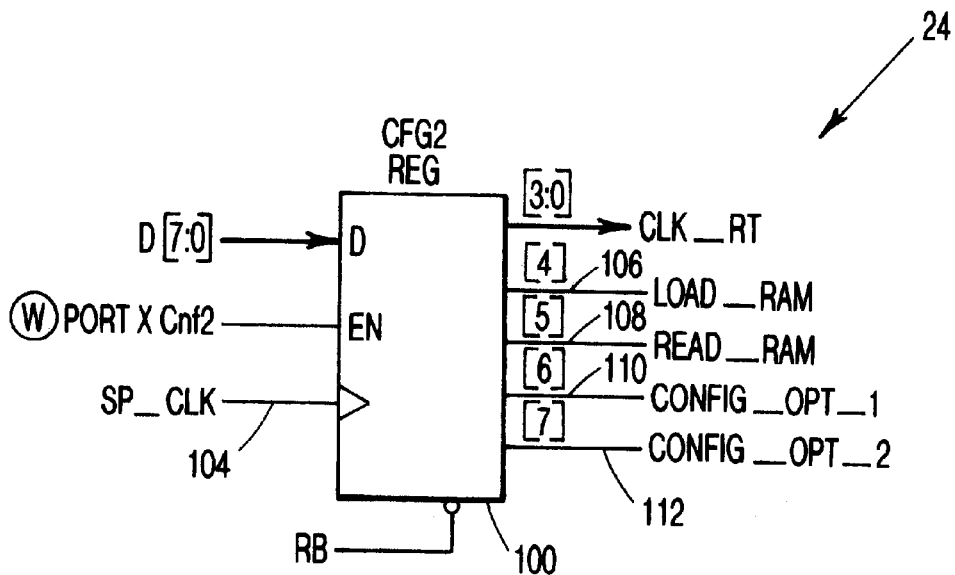
Figure 6:
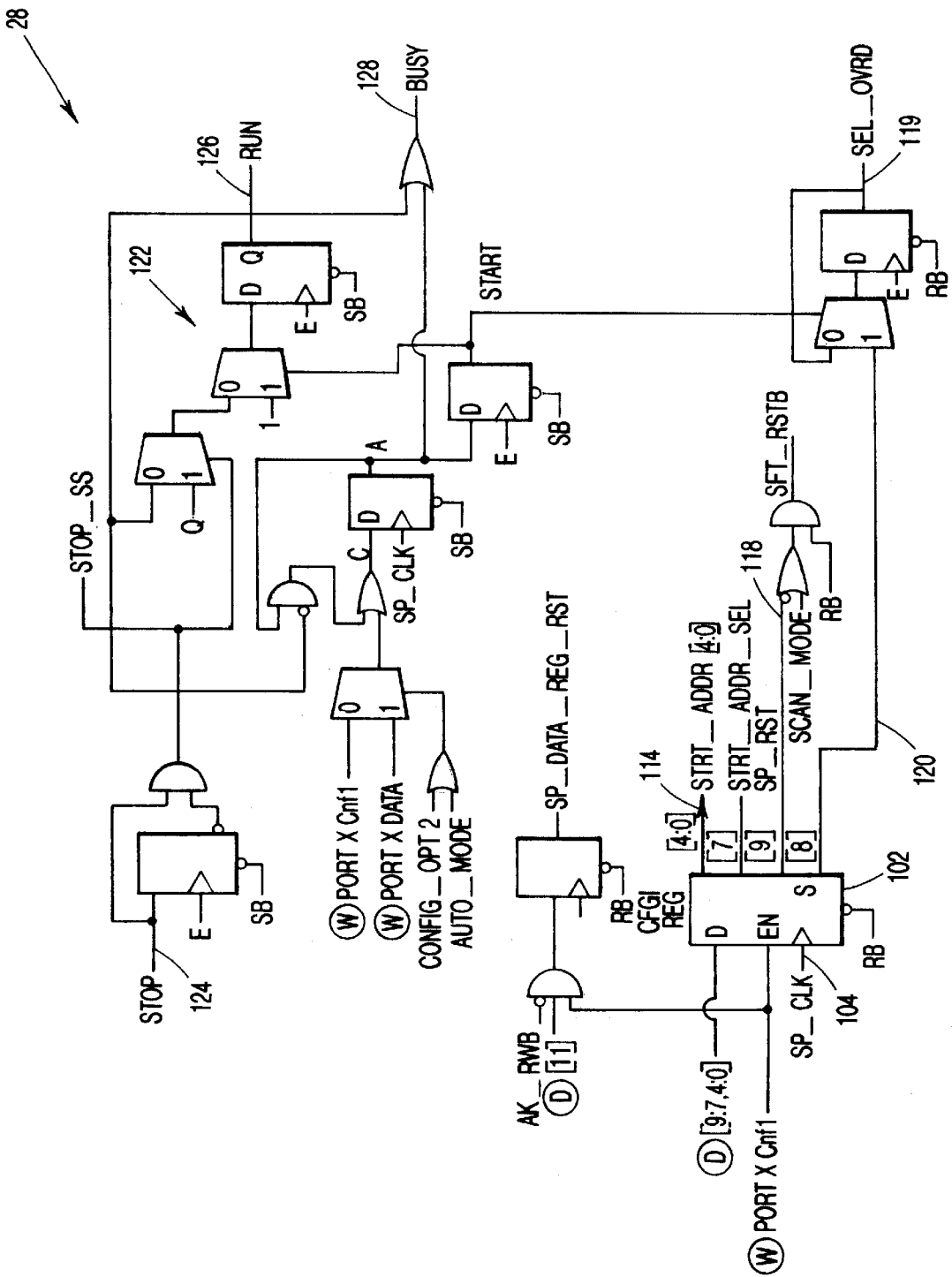

The actual configuration data supplied by the RAM 12 to control the various operational circuitry of the serial port is held in two configuration registers, one register 100 being shown in FIG. 5 and the second reciter 102 being shown in FIG. 6. With reference first to FIG. 5, the configuration register 100 receives data from the RAM 12 output data pins numbered [0–7] on its input. The configuration register 100 is enabled by signal "W" and is clocked by the serial port clock on line 104. The configuration register 100 produces the "LOAD RAM" signal on output line 106, the "READ RAM" signal on line 108, and two optional configuration signals on lines 110 and 112. The optional configuration signals may be used to, for example, to determine particular running modes of the serial port circuitry.

The second configuration register 102 shown in FIG. 6 receives its data from output pins [0–4] and [7–9] of the RAM 12 on its input terminal. Like register 100, the configuration register 102 is enabled by the signal "W" and is clocked by the serial port clock signals on line 104. The output from the configuration register 102 provides the start address on output lines 114 and a start address select signal on output line 116. The serial port reset signal is provided on output line 118, and a select OVRD register signal is provided on output line 119. The select OVRD signal is applied to the control signal gates 72, shown in FIG. 3b.

The run and busy signals to the control circuit 18 of FIG. 2b are developed in the circuit 28, shown in detail in FIG. 5, to which reference is now additionally made. In addition to the configuration register circuit 102 described above, run and busy signals are developed by the circuitry 122, which responds to the stop signal 124 applied at the in out to develop the run and busy signals respectively on lines 126 and 128. The stop signal applied on line 124 is generated by an op-code decoder 32 shown in FIG. 8.

Figure 7:
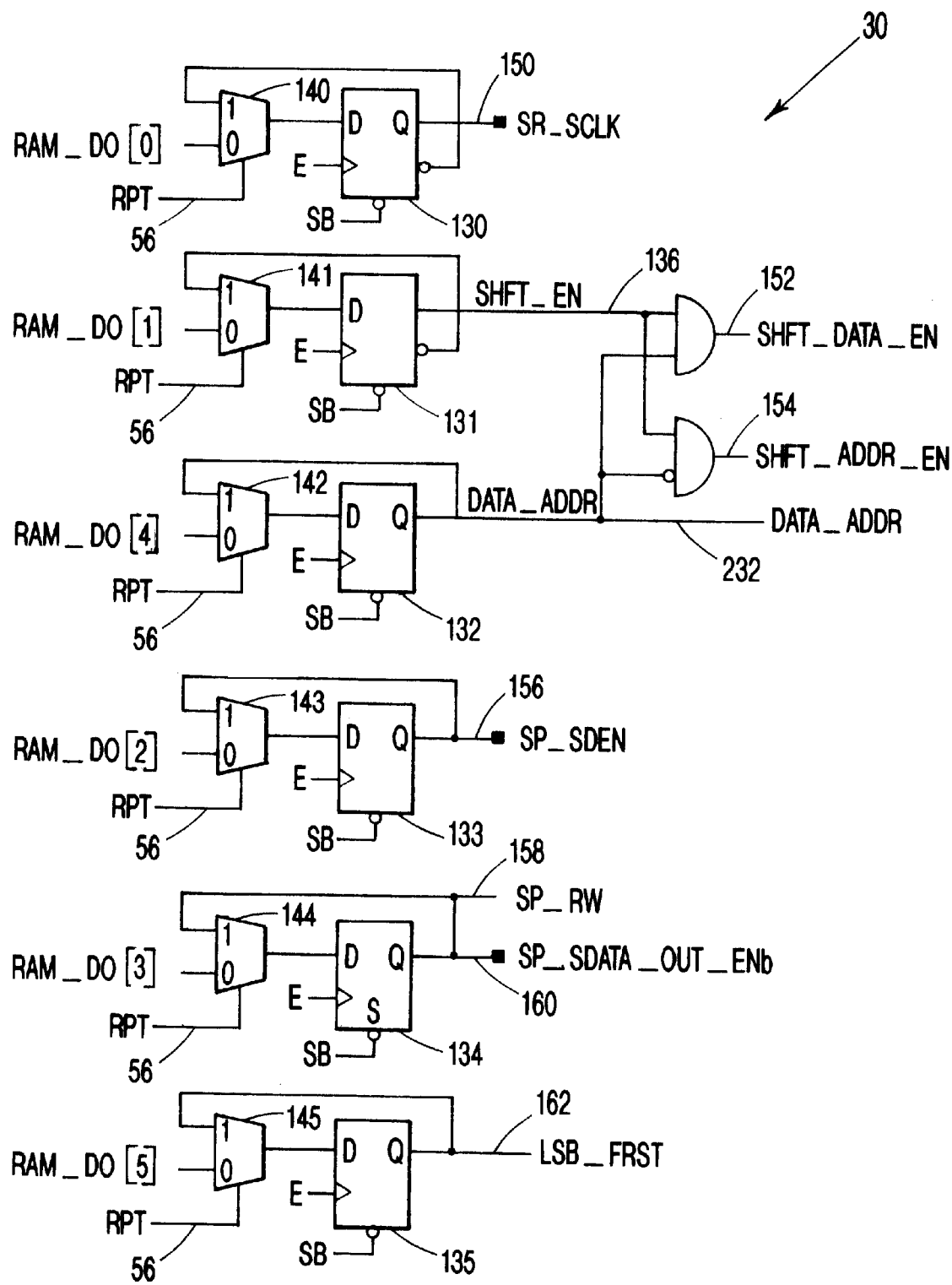

A state machine configuration circuit 30 is shown in FIG. 7, to which reference is now made. The configuration circuit 30 is essentially a state machine driven by the op-codes and other configuration information provided by the RAM 12. Thus, the values loaded into the RAM 12 provide a series of op-codes that are provided to the remaining circuitry of the serial port to operate the circuitry in the desired manner. The RAM 12 additionally contains configuration signals to configure the circuitry in accordance with the desired operation thereof, all of which will become apparent from the following detailed description.

The state machine 30 develops latched control signals from the [0–5] output lines of the RAM 12, which are initially applied to latch circuits 130–135 via multiplexers 140-145, Thus, the state machine 30 develops six control signals that are required to control the three serial port pins, as below described in detail.

The six control signals are:

Clock on line 150, which controls the clock pin.

Data shift register enable on line 136, which enables the selected shift register to shift one on the next state machine cycle.

Data/Address on line 232, which selects the data or the address shift register for action.

Shift gate on line 154, which controls the shift gate pin.

Data enable on line 152, which controls the direction of the bi-directional data pin (input or output).

And LSB first on line 162, which controls the direction of shifting of the selected shift register when the shift register shift enable is asserted.

In operation, when the repeat mode is engaged, the clock and shift register shift enable control signals are toggled as stated above, and the data/address, shift gate, data enable, and LSB first control signals are held as remain the same.

The addition of a branch instruction to the state machine, among other things, allows the state machine to implement a "select override" function. The branch instruction forces the RAM address to change to the value of the operand in the instruction, thus causing the state machine to branch to the specified location.

A final addition to the state machine allows for the use of different start addresses. This allows the state machine to implement different start addresses. This allows the state machine to implement different serial port specifications, or serial port write, or read functions just by starting the state machine at different starting addresses.

These control signals are controlled by the RPT signal on line 56, developed at the output of the repeat counter circuit 22 shown in FIG. 3. Thus, when the repeat signal on line 56 is low, the outputs on output lines 0–5 of the RAM 12 are applied directly to the latch circuits 130–135. On the other hand, when the RPT signal on line 56 is high, the values latched in the respective latches 130–135 are recirculated and held to produce at the output terminals thereof the respective shipped register clock signal on line 150, the shift registered data enable signal on 152, the shift register address enable signal on line 154, the serial port "SDEN" on line 156, the serial port lead right signal on line 158, the serial port data output enable signal on line 160, and the significant bit output first on line 162. It can be seen that the signals on the output lines from the circuit 30 primarily control the serial port shift registers described below with reference to FIGS. 10a and 10b.

Figure 8:
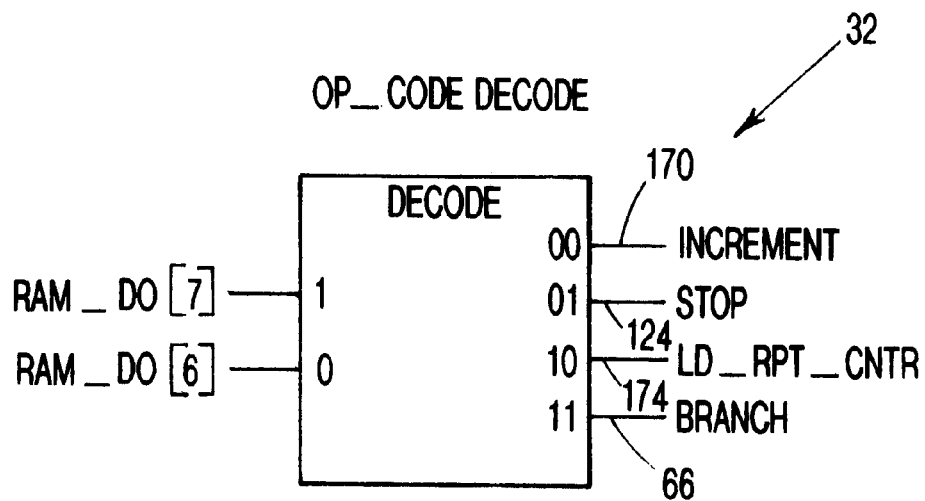

An op-code decode circuit 32 is provided, as shown in FIG. 8 to which reference now additionally made. The op-decode circuit 32 receives inputs from the output lines [6–7] of the RAM 12 to decode the signals thereon to provide an increment signal on line 170, a stop signal on line 172, a load repeat counter signal on line 174, and a branch signal on line 176. Thus, at the beginning of an operation, the op-code delivered from the RAM 12 typically would be decoded by the oq-code decoder 32 to generate a load repeat counter command signal on line 174 to load into the repeat counter 48 the repeat value contained at the output lines [8–12] of the RAM 12. The net op-code delivered from the RAM 12 typically would be an increment command, delivered on line 170 to the input of AND gate 71 (FIG. 3b). During the time that the increment signal 170 exists, the address is delivered from the RAM 12 are consecutively incremented to produce the previously encoded op-codes and data at the various RAM locations corresponding to those addressed by the address signals applied to its input.

If the op-code produced on output lines [6] and [7] of the RAM 12 produce a branch instruction, that is decoded by the op-code decoder 32 on line 66. The branch signals on line 66 are applied to its respective AND gate in the AND gate set 72 (FIG. 3b) to selected the branch address applied on line 92 to the multiplexer 60 to specify the next address to be applied to the RAM 12.

Finally, if the op-code delivered from the RAM 12 is a decoded by the decoder 32 to Include a stop command, that is applied on output line 124 to the input of the run circuitry 122, shown in FIG. 6, to change the state of the run output signal on line 126.

Figure 9:
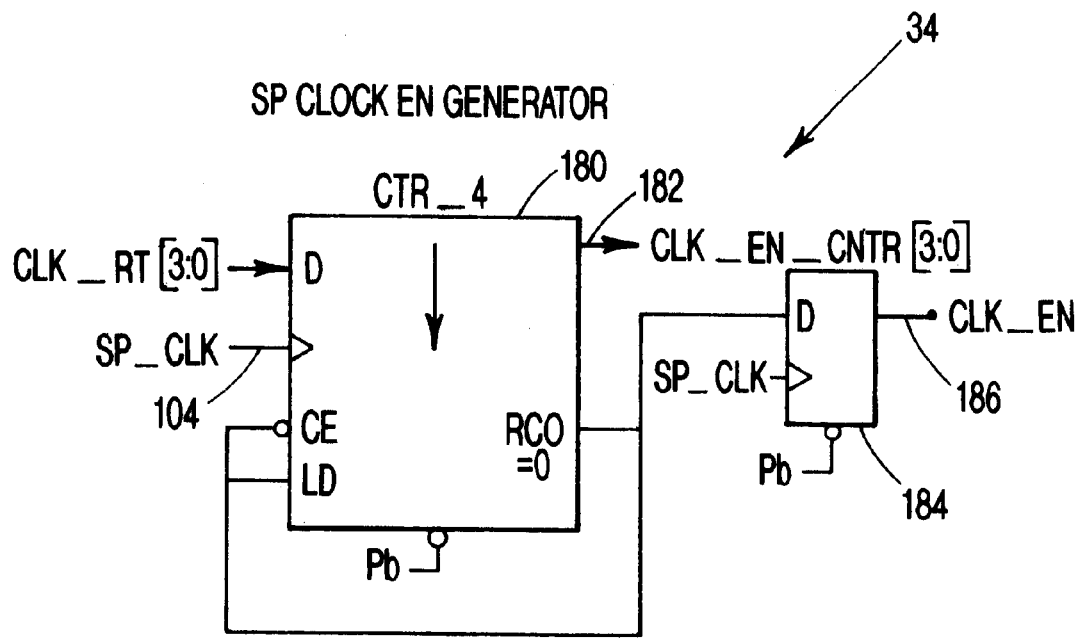

The serial port clock signals are provided by a serial port clock (not shown) which is enabled by a serial port clock enable generator circuit 34, shown in FIG. 9, to which reference is now made. The serial port clock enable generator circuit 34 includes a counter 180, which is clocked by serial port clock signals on line 104. The input to the counter 180 includes the clock rate "CLK RT" data bits from an available clock source. The output from the counter 180 is provided on output line 182, which provides an output clock enable counter signal. In addition, the output from the counter 180 is latched in latch 184, to provide clock enable signals on line 186.

Figure 10A:
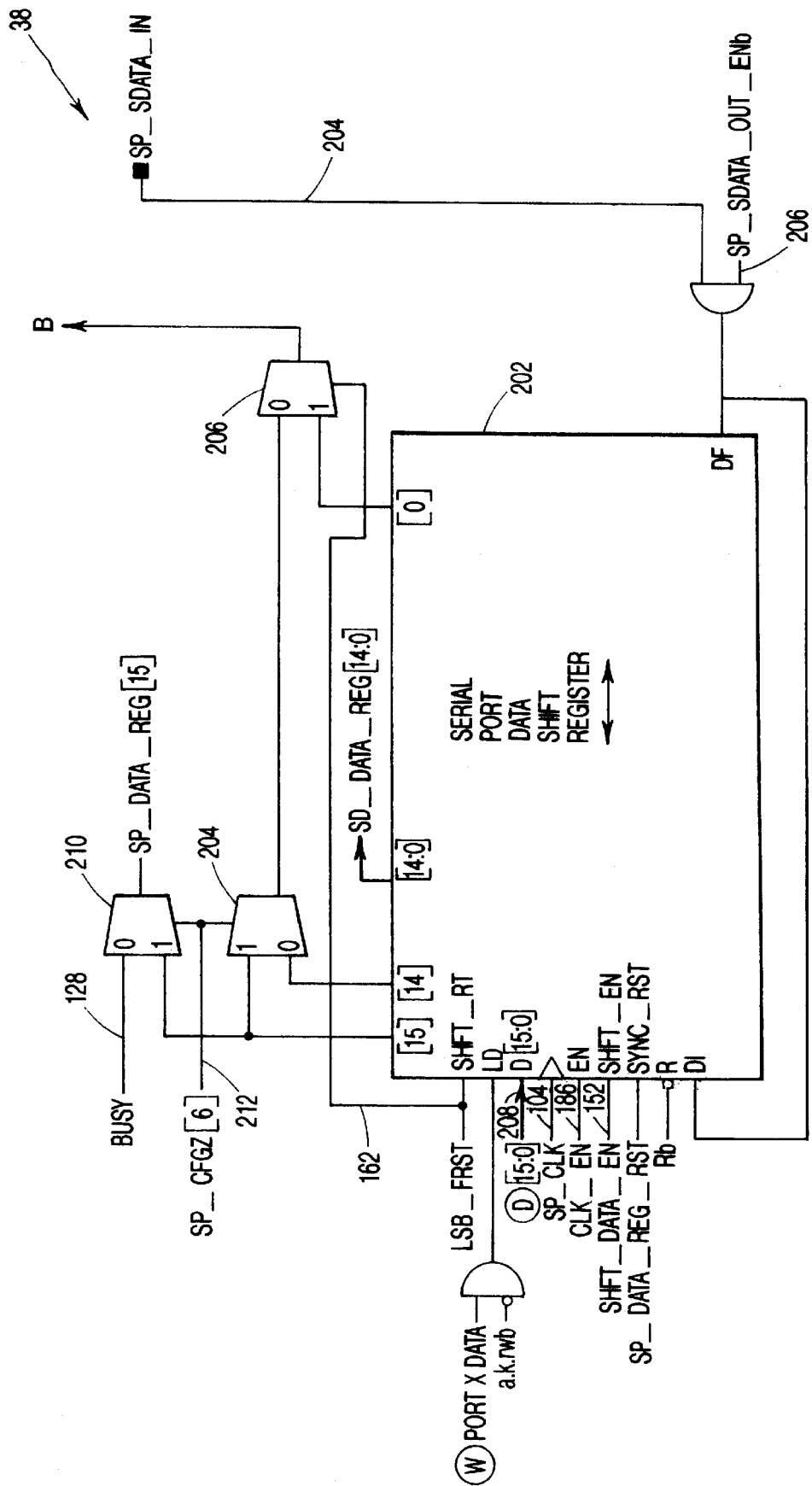
Figure 10B:
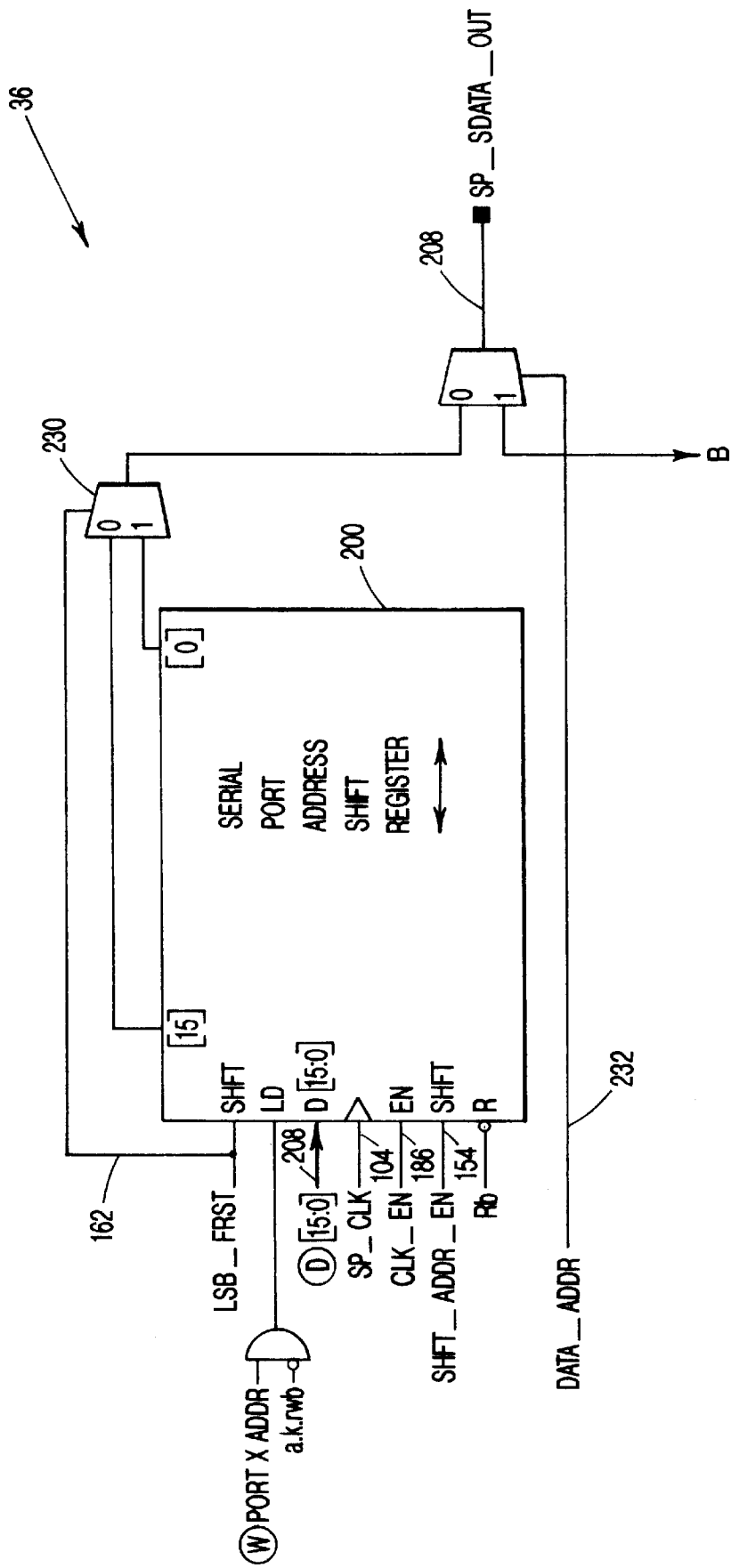

Finally, in addition to performing other functions, the above described circuitry controls two shift registers, 200 and 202, shown respectively in FIGS. 10a and 10b, to which reference is now additionally made. The shift registers 200 and 202 are used as a serial port address shift register and serial port data shift register, in the embodiment shown; however, the registers can be used for other purposes, depending upon the particular specifications of the serial port desired to be achieved. The serial port data shift register 202 holds the data word that is to be either sent or received by the serial port, depending on whether the current operation is a serial port read or a serial port write operation. The address shift register 200 holds the address field for the serial communication.

Additionally, as discussed above, manufacturers are often inconsistent in the manner in which data input and output is specified. More particularly, some manufacturers specify that data should be shifted into and out of the serial port registers with least significant bits first, others specify most significant bits first. Nevertheless, by virtue of the flexibility of the circuit herein described, the RAM 12 can be configured to contain configuration information that is applied to control the serial port registers regardless of the desired mode of operation thereof.

For example, with reference first to FIG. 10a, data may be received by the serial port data shift register 202 on serial port data input line 204 together with an enable signal on line 206. The serial port data enable signal may be generated, for example, by the state machine 30 described above with reference to FIG. 6, in dependence upon the configuration data contained on output line 3 of the RAM 12. The input data is applied to both the DI and DF input pins of the shift register 202 so that it can be clocked into the shift register in whichever direction is specified by the signal on the line 162. The signal on line 162, as above described, is generated from the output location 5 of the RAM 12, latched by the latch 135 of the state machine 30, described above with reference to FIG. 6. Similarly, the signal on line 162 controls multiplexer 206 to control the output locations from which the data contained in the shift register 202 is read out for output on line 208 (see FIG. 10b) when the data is to be outputted from the serial port.

Still more particularly, the data shift register 202 is enabled by a clock enable signal on line 186, which was developed by the serial port clock enabled generator 34 described above with respect to FIG. 8. The clock signal applied to the shift register 202 is the serial port clock signal provided on line 104. The load data command is provided by the signal "W". The shift data enable signal is provided on line 152. The shift data enable signal was developed by the output number [1] from the RAM 12, latched by the latch 131 in the state machine circuit 30 of FIG. 6. The data itself is provided on lines 208 for use by the hard disk drive with which the serial port circuitry is associated.

The multiplexers 204 and 210 are provided to pass either the busy signal on line 128, generated from the run/busy circuitry 122 of FIG. 5, or the data output on the serial port register pins [14] and [15], as selected by the serial port configuration signal on line 212. Thus, depending upon the direction of data shift specified for the shift register 202, data is provided as an output from the shift registry either from pin [14] or pin [15], as specified by the LSB first signal, to be passed through multiplexer 206 to the data output line 208. Thus, depending upon the particular manufacturer's specifications, either 15 or 16 bits of information can be provided as an output, the selection being made by the serial port configuration signal 212 and multiplexer 204. The serial port data register signal 15 or busy signal specified by the signal on line 128.

A second serial port shift register 202 is provided, and is specifically shown in FIG. 10b. Although the serial port shift register 200 is labeled In the embodiment illustrated as an "address" shift register, it should be understood that the overall serial port is sufficiently configurable to use the serial port shift register 200 as either an address or a data shift register. The determination as to whether the serial port address shift register 200 operates in a data mode or in an address mode is determined by the RAM output bit [4], which is latched in latch 132 of the state machine 30 of FIG. 6.

Moreover, the serial port registers can be configured to operate as a single 32 bit data register. For example, in a 32 bit embodiment, 16 data bits can be provided by the serial port shift register 202 (FIG. 10a) and the second 16 data bit capability can be provided by the serial port shift register 200 of FIG. 10b.

In contrast to the serial port shift register 202, which was enabled by a shift enable signal on line 152, the serial port shift register 200, if used as an address register, is enabled by a shift address enable signal developed on line 154. The shift data and shift address enable signals are developed in dependence upon the data contained on output lines [1] and [4] of the RAM 12, and are latched in data latches 131 and 132 of the state machine 30, shown in FIG. 6.

The connections to the serial port shift register 200 are similar to those described above with respect to the serial port data shift register 202, except that an additional multiplexer circuit 230 is provided. The additional multiplexer circuit 230 serves to select the data direction output, either from the least significant bits first or most significant bits first outputs [0] or [15] as determined by the LSB kirs signal on line 62, in a manner as described above.

The outputs from either the serial port shift register 202 or serial port shift resister 200 are selectively outputted on the output line 208 in dependence upon the state of the data address signal on line 232. The data address signal on line 232 is developed and latched in latch 132 from the output number [4] of the RAM 12.

Consequently, it can be seen that the serial port shift registers 200 and 202 can be flexibly configured in a number of different ways in dependence upon the configuration data states that are written into the RAM 12. An example configuration of the serial port circuit is given in Table 1, which shows the contents of the RAM 12, the configuration register number 1, 102, configuration register number 2 100, the RAM load data for a write operation, the RAM data for a read operation, the data register, and the address register. By selecting values for the various RAM and register contents, the serial port can be flexibly configured to perform almost any combination of functions, depending upon the individual manufacturer specifications. In Table 2, the various module names set forth correspond to the module names used in the Veriog code attached here to, as below described.

TABLE 2

| | RAM 12 |
|---|---|
| [12:8] | Load Value for Counter 48 "Continue Time" |
| [7:6] | 0,0 - Drive Serial Port Directly trom ROM |
| | 0,1 - Stop, deassert Busy, Reset Addr to "StartAddr" |
| | 1,0 - Load Counter & Continue for [12:8] counts |
| | Note: [5:0] are driven directiy during this period |
| | 1,1 - Branch to [12:8] |
| [5] | LSB First |
| [4] | Data_Address |
| | 1 = Data |
| | 0 = Address |
| [3] | Output Tri-state enable |
| | 1 = Qutput SP Data/Address |
| | 0 = Input Data |
| [2] | Output SP - Shift Gate |
| [1] | Shift Register (Data or Address per [4]) Shift Enable |
| [0] | Output Serial Port Clock |
| | Configuration Register 1 (102) - R/W |
| | SPPortXCnflReg |
| [11] | S/S to Reset Serial Port Data Register |
| [10] | Busy - Read only |
| [9] | Serial Port Reset |
| [8] | Select Override Function |
| | 0 = Deassertion of Busy Points RAM to "Start Address" |
| | 1 = Deassertion of Busy Halts Machine at next Address after the "Stop" op-code |
| [7] | Address Select |
| | 1 = Start Address = [4:0] |
| | 0 = Start Address = 5'ho |
| [4:0] | Start Address |
| | Configuration Register 2 (100) R/W |
| | SPPortXCnf2Reg |
| [7] | Configuration Option #2 - Triggers SP Comm |
| | 0 = Write to Configuration Register #1 (102) |
| | 1 = Write to SP Data Register (100) |
| [6] | Configurarion Option #1 |
| | 0 = Bit is of SP Data Register (202) = Busy |
| | 1 = Bit is of SP Data Register (202) = Bit 15 of Data Shift Register -> Data Shift Register (202) is a 16-bit register |
| [5] | Read RAM Mode |
| [4] | Write RAM Mode |
| [3:0] | Clock Rate |
| | 0000 = input clock/2 |
| | 0001 = input clock/4 |

TABLE 2-continued

|  | 0010 = input clock/6 |
|---|---|
|  | 0011 = input clock/8 |
|  | etc. |
|  | RAM Data Load - Write SPPortXRamReg |
| [12:0] | RAM 12 data is to be Loaded |
|  | This is a direct write to the RAM location, like writing to a register. |
|  | Configuration Register (100) Bit [4] must be set (=1) to allow write operations |
|  | RAM Data Read SpportXRamReg |
|  | If Configuration Register (100): |
|  | - Bit [4] = 0 and bit [5] = 1, then a normal read operation occurs, similar to reading a register. The RAM location specified by the up address bus will be read |
|  | - if bit [5] = 0 the location read will be specified by the state machine |
|  | Data Register (Not shown) SPPortXData Reg |
|  | (Writes directly to and reads directly from the Serial Port Shift Register (200) |
| [15] | Busy or bit 15 of the Serial Port Shift Register as a function of pin [6] of Configuration Register #2 (100) |
| [14:0] | Contents of Serial Port Shift Register [14:0] |
|  | Address Register (not shown) SPPortXddrReg |
|  | (Write Only Directly to Address Shift Register) |

Because the serial port is widely versatile, it will be appreciated that in some applications the serial port circuitry can be essentially replicated to provide two or more serial ports in a single mass data storage device. In such serial port replication, each serial port can be individually configured to perform desired individual functions, as needed.

It will be appreciated that the circuit functions described herein can be constructed or realized through the use of software tools for integrated circuit design. Such software tools are often referred to as high-level description language (HDL) or Very High Speed Integrated Circuit Hardware Description Language (VHSIC-HDL or VHDL) design tools. Such software tools can transform circuit definitions, specifications, and functions into integrated circuit hardware, without a need to specify any particular hardware implementation, layout, or design. Examples of such software tools are Verilog and tool call design compilers available from Synopsys, Inc. of Mountain View, Calif., the Behavior to Structure Translator (BEST) synthesis tool developed by Unisys Corporation, the DesignBook Synthesis tool from Escalade, and the Synergy synthesis tool available from Cadence Design Systems, Inc. Thus, one implementation of a serial port interface, according to one embodiment of the invention, may be realized by the Verhlog VHDL code attached hereto as Attachment 1.

Although the invention has been described and illustrated with a certain degree of particularity, it is understood that the present disclosure has been made only by way of example, and that numerous chances in the combination and arrangement of parts can be resorted to by those skilled in the art without departing from the spirit and scope of the invention, as hereinafter claimed.

What is claimed is:

1. Serial port circuitry for use in a mass data storage device, comprising:
   a serial port for providing information from circuitry within said mass data storage device for use external to said mass data storage device; and
   user programmable circuitry connected to said serial port to receive externally applied signals to modify at least one parameter of said mass data storage device;
   wherein said user programmable circuitry comprises a sequencer programmed to selectively provide at least two different serial port control outputs to modify at least two parameters of said mass data storage device;
   wherein said sequencer executes pre-established program instructions to control said mass data storage device; and wherein said instructions are contained in a RAM;
   a state machine configured by selected outputs states of said RAM;
   an address generator for applying addresses to said RAM for producing said selected outputs from said RAM; and
   a timing circuit for timing programmable time periods for continuing execution of selected RAM output commands.

2. The serial port circuitry of claim 1, wherein said address generator provides at least a start address, an incremented address, and a branch address for application to said RAM.

3. The serial port circuitry of claim 1, further comprising at least one serial port shift register, and wherein said state machine configures said at least one serial port shift register at least with respect to a direction data is shifted into and out thereof.

4. The serial port circuitry of claim 3, wherein said state machine additionally configures said at least one serial port shift register to contain a selected number of bits.

5. The serial port circuitry of claim 3, wherein said at least one serial port shift register includes two shift registers.

6. The serial port circuitry of claim 5, wherein one of said two shift registers is a data register and one of said two shift registers is an address register.

7. The serial port circuitry of claim 5, wherein both of said two shift registers are data registers.

8. Serial port circuitry for use in a mass data storage device, comprising:
   a serial port for providing information from circuitry within said mass data storage device for use external to said mass data storage device;
   user programmable circuitry connected to said serial port to receive externally applied signals to modify at least one parameter of said mass data storage device; and
   wherein said at least one parameter of said mass data storage device is a gain of a preamplifier associated with a read head of said mass data storage device.

9. Serial port circuitry for use in a mass data storage device, comprising:
   a serial port for providing information from circuitry within said mass data storage device for use external to said mass data storage device;
   user programmable circuitry connected to said serial port to receive externally applied signals to modify at least one parameter of said mass data storage device; and
   wherein said at least one parameter of said mass data storage device is a control of parameters of a read/write head of said mass data storage device.

10. Serial port circuitry for use in a mass data storage device, comprising:
   a serial port for providing information from circuitry within said mass data storage device for use external to said mass data storage device;
   user programmable circuitry connected to said serial port to receive externally applied signals to modify at least one parameter of said mass data storage device; and wherein said at least one parameter of said mass data storage device is a spindle speed control circuit of said mass data storage device.

11. Serial port circuitry for use in a mass data storage device, comprising:

a serial port for providing information from circuitry within said mass data storage device for use external to said mass data storage device;

user programmable circuitry connected to said serial port to receive externally applied signals to modify at least one parameter of said mass data storage device; and wherein said at least one parameter of said mass data storage device is a control of at least some parameters of a voice control motor of said mass data storage device.

12. Serial port circuitry for use in a mass data storage device, comprising:

a serial port for providing information from circuitry within said mass data storage device for use external to said mass data storage device;

user programmable circuitry connected to said serial port to receive externally applied signals to modify at least one parameter of said mass data storage device; and wherein said at least one parameter of said mass data storage device is a spindle speed control circuit of said mass data storage device.

13. Serial port circuitry for use in a mass data storage device, comprising:

a RAM programmed to contain operation codes and serial port configuration data, said RAM being addressable for producing the addressed operation codes and port configuration data on outputs of said RAM;

a circuit for addressing said RAM in a predetermined sequence to operate serial port circuits in accordance with said operation codes and configuration data contained in said RAM;

and a circuit for timing a repeat time, determined by data contained in said RAM, for continuing selected output operation codes and configuration data for said repeat time.

14. The serial port circuitry of claim 13 further comprising a serial port shift register for receiving and delivering data to and from said serial port.

15. The serial port circuitry of claim 14 wherein said circuit for addressing said RAM operates to selectively sequentially increment addresses applied to said RAM, branch to a selected unsequential address, and repeat an address for a predetermined repeat time determined by said circuit for timing a repeat time.

16. The serial port circuitry of claim 14 further comprising a state machine for delivering control signals to said shift register in accordance with said operation codes and configuration data contained in said RAM.

17. The serial port circuitry of claim 16 wherein said state machine configures said serial port shift register with respect to a direction data is shifted into and out thereof.

18. The serial port circuitry of claim 16 wherein said state machine configures said serial port shift register with respect to a number of bits said register contains.

19. The serial port circuitry of claim 16 further comprising an address shift register having at least come configuration parameters controlled by said state machine.

20. A mass data storage device comprising:

a serial port circuitry for use in a mass data source device, including:

a RAM programmed to contain operation codes and serial port configuration data, said RAM being addressable for producing the addressed operation codes and port configuration data on outputs of said RAM;

a circuit for addressing said RAM in a predetermined sequence to operate serial port circuits in accordance with said operation codes and configuration data contained in said RAM;

and a circuit for timing a repeat time, determined by data contained in said RAM, for continuing selected output operation codes and configuration data for said repeat time.

21. The mass data storage device of claim 20 further comprising a serial port shift register for receiving and delivering data to and from said serial port.

22. The serial port circuitry of claim 20 wherein said circuit for addressing said RAM operates to selectively sequentially increment addresses applied to said RAM, branch to a selected unsequential address, and repeat an address for a predetermined repeat time determined by said circuit for timing a repeat time.

23. The serial port circuitry of claim 21 further comprising a state machine for delivering control signals to said shift register in accordance with said operation codes and configuration data contained in said RPM.

24. The serial port circuitry of claim 23 wherein said state machine configures said serial port shift register with respect to a direction data is shifted into and out thereof.

25. The serial port circuitry of claim 23 wherein said state machine configures said serial port shift register with respect to a number of bits said register contains.

26. The serial port circuitry of claim 23 further comprising an address shift register having at least come configuration parameters controlled by said state machine.

* * * * *